United States Patent
Forsyth et al.

(10) Patent No.: US 8,025,912 B2
(45) Date of Patent: Sep. 27, 2011

(54) METHOD FOR PACKAGING BANANAS FOR RIPENING

(75) Inventors: Kevin Forsyth, Pembroke Pines, FL (US); Raul U. Fernandez, Weston, FL (US); Gonzalo Marquez, Miami, FL (US)

(73) Assignee: Chiquita Brands Inc., Cincinnati, OH (US)

( * ) Notice: Subject to any disclaimer, the term of this patent is extended or adjusted under 35 U.S.C. 154(b) by 105 days.

(21) Appl. No.: 11/758,837

(22) Filed: Jun. 6, 2007

(65) Prior Publication Data

US 2008/0008794 A1   Jan. 10, 2008

Related U.S. Application Data

(60) Provisional application No. 60/805,928, filed on Jun. 27, 2006.

(51) Int. Cl.
*B65D 81/20* (2006.01)

(52) U.S. Cl. ......... 426/118; 426/112; 426/263; 426/316

(58) Field of Classification Search ............... 426/106, 426/112, 118, 316, 392, 263; 206/524.2
See application file for complete search history.

(56) References Cited

U.S. PATENT DOCUMENTS

| | | | |
|---|---|---|---|
| 5,556,658 A | 9/1996 | Raudalus et al. | |
| 5,617,711 A | 4/1997 | Rodriquez et al. | |
| 6,013,293 A | 1/2000 | De Moor | |
| 2002/0127305 A1 * | 9/2002 | Clarke | 426/106 |

OTHER PUBLICATIONS

Carbon dioxide, Dec. 7, 2002.*
Oyxgen, Dec. 9, 2000.*
U.S. Appl. No. 11/758,793, filed Jun. 6, 2007, Forsyth et al.

* cited by examiner

*Primary Examiner* — Rena Dye
*Assistant Examiner* — Preston Smith
(74) *Attorney, Agent, or Firm* — Frost Brown Todd LLC

(57) ABSTRACT

A method for storing respiring produce, particularly bananas, during ripening is disclosed. The method allows bananas to remain in the ripened condition for an extended period of time while, at the same time, having improved sweetness and taste characteristics. In addition, the method does not require separate handling and repackaging of the bananas between the starting of the ripening process and storage/shipment of the bananas. In this method, ripening is initiated by inserting additional gas into the banana package, such that the gas medium comprises from about 2.0% to about 5.0% oxygen, from about 5.0% to about 15.0% carbon dioxide, from about 0.8% to about 1.5% ethylene, the remainder of the gas medium being predominantly nitrogen, for a period of from about 0.5 to about 5 seconds. The composition of the gas medium in the package is then adjusted such that the gas medium has a ratio of oxygen to carbon dioxide which meets the following conditions:

(20.94−B)/C=from about 1.8 to about 3.8; wherein B is the percentage of oxygen in the gas medium, C is the percentage of carbon dioxide in the gas medium, and, further, wherein the percentage of oxygen in the gas medium is from about 1.0 to about 6.0, and the percentage of carbon dioxide in the gas medium is from about 3.0 to about 10.0.

9 Claims, 1 Drawing Sheet

METHOD FOR PACKAGING BANANAS FOR RIPENING

This application is based upon and claims priority from U.S. Provisional Application No. 60/805,928, filed Jun. 27, 2006, incorporated herein by reference.

FIELD OF INVENTION

The invention relates to the field of packaging and storing fruits and vegetables, in particular, bananas.

BACKGROUND OF THE INVENTION

During transport and storage of bananas, starting at the moment of harvesting until delivery to the distribution network and directly to the consumer, it is necessary to pack bananas for different modes of ripening and storage, at various points in the process. Bananas are usually harvested when they are unripe (green), and stored at a temperature between 56° F. and 59° F. They can be stored in such a way for a sufficiently long time.

To activate the banana ripening process, the temperature is usually increased to 60° F.-62° F. and/or the composition of the gas medium surrounding the bananas is changed by adding ethylene to it. Ethylene, combined with an increased temperature, contributes to the beginning of the banana ripening process.

The standard procedure for activating the ripening process is as follows: Bananas in boxes are placed inside a gas treatment facility chamber, where they are held for 2-3 days. The composition of atmosphere inside the chamber is: 5% oxygen; 5% carbon dioxide; 0.5-1.5% ethylene; the rest is nitrogen. Later, the bananas are removed from the gas treatment chamber, and allowed to ripen for 7-10 days.

Different innovations are known from the Prior Art that relate to methods for bananas storage and packing.

In U.S. Pat. No. 5,556,658, "Method for packaging, storing and ventilating produce", Raudalus et al, issued Sep. 17, 1996, a container system is described that is intended for transportation and storage of bananas. The system includes the external tare, internal container, and a flexible bag positioned inside the container, in which the bananas are placed. The container has holes for ventilation, while the flexible bag has means for opening and closing. Such a design provides for the required ventilation and temperature for banana storage. The ability to open the bag allows ethylene to be delivered inside the bag, which activates the banana ripening process.

In U.S. Pat. No. 6,617,711, "Method of producing a container of bananas and method of transferring bananas", Rodriguez et al, issued Apr. 8, 1997, a method for manufacturing a container for transportation and storage of bananas is described. The method utilizes a flexible internal container that is inserted into the external tare prior to placing banana clusters into it. The banana clusters are placed in layers, with gaps between them created with filling gaskets. Such placement of bananas can provide for ventilation and an even temperature throughout the entire inner space of the container.

In U.S. Pat. No. 6,013,293, "Packaging respiring biological material with atmosphere control member", De Moor, issued Jan. 11, 2000, packaging is described which provides for required gas composition during storage of fruits and vegetables and other respiring biological materials. Part of the packaging is made as a gas-permeable membrane, which has selective properties, ie, lower oxygen permeability as compared to carbon dioxide. The membrane provides optimum conditions for storing bananas because oxygen is delivered into a package from the external environment, while carbon dioxide, which is released during the ripening process, is removed from the packaging.

Known methods for packaging bananas do not allow the process of ripening to begin without repacking and forced change of the atmosphere inside the package, since these processes require different gas compositions.

The invention claimed herein is directed at simplifying the method for packaging bananas for the purpose of their ripening, and for providing a longer shelf-life during the ripening stage.

BRIEF SUMMARY OF THE INVENTION

The method of the present invention is as follows: bananas are placed inside a package equipped with a means for providing a gas exchange between the gas mixture inside the package and the external atmosphere, where the ratio of oxygen to carbon dioxide in the package is:

$PR=(20.94-B)/C=$about 1.8 to about 3.8; preferably from about 2 to about 3.4;

where: $B=$percentage of oxygen (by weight) in the composition of the gas medium, and $C=$percentage of carbon dioxide (by weight) in the composition of the gas medium.

In this case, the indicated percentage of oxygen and carbon dioxide in the gas medium are selected from the following values:

Oxygen % (by weight): from about 1.0 to about 6.0; and Carbon dioxide % (by weight): from about 3.0 to about 10.0.

To activate banana ripening, the package is filled with a gas mixture consisting of nitrogen, oxygen, carbon dioxide, and ethylene, in the following proportions: Oxygen % (by weight): from about 2.0 to about 5.0; Carbon dioxide, % (by weight): from about 5.0 to about 15.0; and Ethylene, % (by weight): from about 0.5 to about 1.5 (the balance is predominantly nitrogen); for a period of time of from 0.5 to 5 seconds.

After ripening has been activated, maintaining the indicated percentage of oxygen and carbon dioxide inside the package over the required period of time, is achieved by using a selective gas-permeable membrane that separates the volume of storage from the external atmosphere. Selective exchange between the gas medium inside the packaging and atmospheric air through a gas-permeable membrane takes place, and thereby the gas medium with the indicated composition is maintained inside the package.

The area of the selective gas-permeable membrane is chosen based on the relationship between the area of the membrane and the area of gas-impermeable portion of the package within the ratio range of from about $5*10^{-4}$ to about $5*10^{-2}$, for example from about $5*10^{-4}$ to about $2*10^{-3}$.

In the method claimed herein, green bananas are placed inside a package equipped with a means for providing a gas exchange between the gas mixture inside the package and the external atmosphere, thereby providing the above-indicated content of oxygen and carbon dioxide in a gas mixture inside the package.

The package is filled with a gas mixture which, along with oxygen and carbon dioxide, also contains a small amount of ethylene (as defined above). It is known that ethylene activates the banana ripening process. However, there is no known process that injects ethylene, oxygen, and carbon dioxide in specific proportions directly into the package where bananas will be stored during ripening, until they are ripe and delivered to the consumer.

Later, during or immediately following ripening, the bananas are stored in a gas medium of a composition that meets the second set of conditions regarding content of oxygen and carbon dioxide. This composition is achieved via a gas-permeable membrane that separates the internal space of package from the external atmosphere.

DETAILED DESCRIPTION OF THE INVENTION

Figure 1:
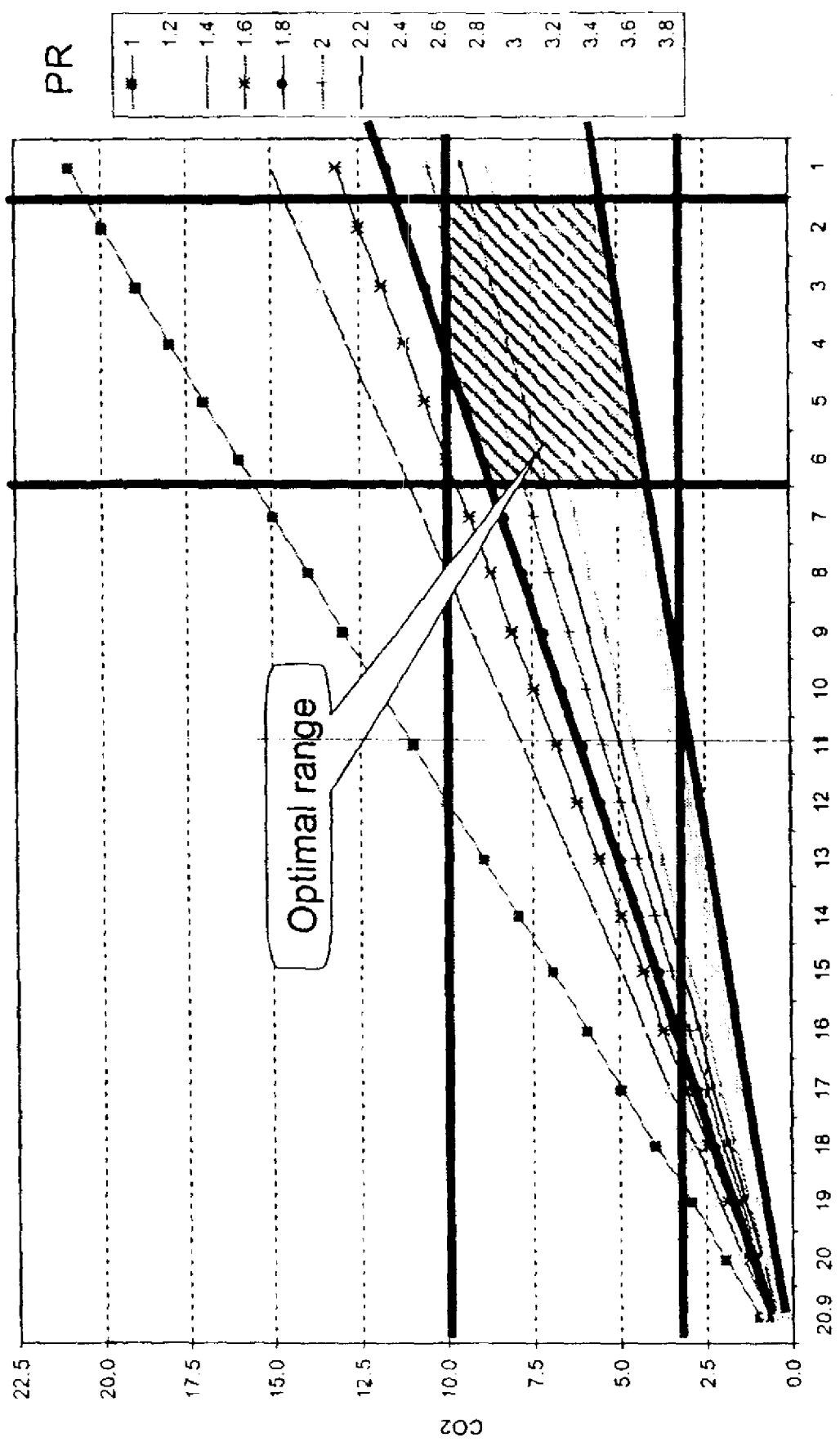
FIG. 1 is a plot of carbon dioxide vs. oxygen content in a package of bananas showing the optimal area for achieving the ripening characteristics described herein.

The method for storing bananas during their ripening which constitutes the present invention, can be implemented in the following way.

Bananas are placed inside a package that allows for gas exchange between the gas mixture inside the package and the external atmosphere. The relationship between oxygen and carbon dioxide is maintained at the following conditions:

$PR=(20.94-B)/C=$ from about 1.8 to about 3.8; preferably from about 2 to about 3.4;

where B=percentage (by weight) of oxygen in the composition of gas medium; and C=percentage (by weight) of carbon dioxide in the composition of gas medium.

In this case, the indicated percentage of oxygen and carbon dioxide in the gas medium is selected from the following values:

Oxygen, % (by weight): from about 1.0 to about 6.0; and carbon dioxide, % (by weight): from about 3.0 to about 10.0.

These conditions determine the area, shown in FIG. 1, where concentrations of oxygen and carbon dioxide should be selected.

After the bananas are placed inside the package, it is filled with a gas mixture consisting of nitrogen, oxygen, carbon dioxide, and ethylene, in the following proportions:

Oxygen, % (by weight): from about 2.0 to about 5.0; carbon dioxide, % (by weight): from about 5.0 to about 15.0; and ethylene, % (by weight): from about 0.8 to about 1.5; the remaining components are other gases, predominantly nitrogen. This atmosphere is maintained in the package from about 0.5 to about 5 seconds, and it begins the ripening process.

The package typically contains from about 0.1 to about 40 pounds of bananas.

During the banana ripening process, modification of the initial gas medium (ie, the ethylene-containing medium) inside the package takes place. The ripening of bananas is accompanied by a decrease in the amount of oxygen and increase in the amount of carbon dioxide. Means for providing the exchange between the gas mixture inside the package and the external atmosphere transitions the initial gas medium to one with an oxygen to carbon dioxide ratio required for quicker ripening and long-term storage, as defined above.

Selective gas-permeable membranes of perforated films can be used to provide a gas exchange between the gas mixture inside the package and the external atmosphere. The indicated membranes or films occupy part of the area of packaging, and are characterized by different permeability values for oxygen and carbon dioxide. In this case, the maintained ratio of oxygen to carbon dioxide meets the above—indicated conditions. Examples of such membranes are taught in U.S. Pat. No. 6,013,293, De Moor, issued Jan. 11, 2000, incorporated herein by reference.

The function of such selective membranes or perforated films can be performed by membranes and films similar to those on the market used in packaging for fruit storage. However, the chosen membranes should possess properties that would provide the necessary (in keeping with the claimed method) composition of gas atmosphere inside the packages.

This method simplifies the banana storage process from the moment ripening begins. It differs from existing methods in that its implementation does not require repacking of bananas while storing them during ripening; this means losses are decreased because there is no damage that would normally occur during reloading and repacking of the bananas.

The outlined method would allow bananas that have achieved a color grade of 5 to be stored for 7 days or longer. That is twice as long as what can be achieved with conventional packaging (extended shelf life). The total shelf life of a banana, using the present invention, after starting the ripening process, can be as long as 16-17 days. compared with 8 days in conventional packaging. Also, improved flavor characteristics (sweeter taste) are achieved at earlier stages of ripening. Bananas of color grade 5 have the taste of those of color grade 6. Also, after being removed from the package, ripe bananas maintain their color grade for 2-3 days.

Bananas stored using the outlined method are also more resistant to changes in external conditions (such as temperature changes).

The method defined herein can be used for the storage of any respiring fruit or vegetables (eg, bananas, avocados). It is particularly useful with regard to bananas.

The results achieved by storing bananas in packaging that provides an exchange between the gas mixture inside the package and the external atmosphere, where the ratio of oxygen and carbon dioxide is maintained at a range of $PR=1.8$ to 3.8, can be shown by studies.

An experiment is performed under the following conditions:

Three bananas, with a total weight of 1.5 pounds after ripening, is kept in a hermetic sealed rigid plastic container with a gas-permeable membrane. The packaging has an internal gas composition with a ratio of oxygen percentage to carbon dioxide as $PR=2.5$. A built-in "Landec" membrane (U.S. Pat. No. 6,013,293), with an operational area defined by a circular area having a diameter of ⅞ inch is used in the package which otherwise is not gas permeable.

A control batch of bananas, with the same quantity and total weight, is preserved in an ordinary hermetically sealed package.

The temperature of bananas during the experiment is 60° F., the degree of ripeness for the bananas is 2 (green) at the beginning of experiment, 4.5-5 at the end.

Sugar content of the bananas is measured during the experiment and the presence of sucrose, fructose, and glucose in the bananas is identified.

When a ripeness degree of 4.5-5 is attained, the sugar content of the stored bananas is measured. The measurement results appear in Table 1.

TABLE 1

| | Sugar Content | | | |
|---|---|---|---|---|
| | Sucrose % | Fructose % | Glucose % | Total % |
| Storage in an ordinary package | 6 | 2.2 | 2.2 | 10.4 |
| Storage in a package that maintains the ratio of oxygen to carbon dioxide as PR = ~2.5 | 3.4 | 3.8 | 4.4 | 11.6 |

The storage of bananas is accompanied by a transition (transformation) of fructose and glucose into sucrose.

Total sugar content during storage of bananas in the package where the PR is maintained as 2.5 appears to be higher (11.6%) than during storage in an ordinary package (10.4%).

Also, during the storage of bananas in the package where the PR at 2.5, the content of fructose and glucose appears to be significantly higher. Thus, the taste characteristics of the bananas are somewhat different.

Bananas in that package also exhibit a significantly less intense transition to sucrose. Ripening of the banana pulp occurs faster than ripening of the peel, which leads to attractive market conditions of bananas, as well as to a sweeter pulp.

During storage in the described package, the banana will "live" for 3 days without any changes, if the package is opened on the ninth day of storage. If the package is opened on the twelfth day, the banana will "live" for 2 days. If the package is opened on the sixteenth day, the banana will "live" for 1 day.

When bananas are stored in an ordinary package, and that package is opened on the fifth day, the banana will "live" without any changes to the peel and pulp for 2 days, but when opened on the sixth day, it will "live" for only 1 day.

The experiments also show that while storing bananas in a package with the specified PR, the package increases the resistance to Chill Injury while storing bananas at temperatures within a range (±3-5° F.) of 54° F.

What is claimed is:

1. A method for extending the ripening period and ripe shelf-life of bananas, said bananas contained in a package which contains from about 0.1 to about 40 pounds of bananas, and which additionally contains a gas medium comprising oxygen and carbon dioxide, said method comprising the steps of:
   (a) activating ripening of the bananas by inserting additional gas into the gas medium such that said gas medium comprises from about 2.0% to about 5.5% (by weight) oxygen, from about 5.0% to about 15.0% (by weight) carbon dioxide, and from about 0.8% to about 1.5% (by weight) ethylene, the remainder of the gas medium being predominantly nitrogen; and
   (b) subsequently adjusting the composition of the gas medium such that the gas medium has a ratio of oxygen to carbon dioxide which meets the following conditions:
   $PR=(20.94-B)/C=$ from about 1.8 to about 3.8,
   wherein B is the percentage (by weight) of oxygen in the gas medium, and
   C is the percentage of carbon dioxide in the gas medium and further,
   wherein the percentage (by weight) of oxygen in the gas medium is from about 1.0 to about 6.0, and the percentage of carbon dioxide in the gas medium is from about 3.0 to about 10.0 and wherein the composition of the gas medium in step (b) is maintained by a selectively gas-permeable membrane which is incorporated into the package containing a non permeable portion wherein the ratio of the area of the selectively gas-permeable membrane to the area of the non-gas permeable portions of the package is from about $5*10^{-4}$ to about $5*10^{-2}$.

2. The method according to claim 1 which allows bananas which have achieved a color grade of 5 to be further stored for at least 7 more days without becoming over-ripe.

3. The method according to claim 1 wherein the PR in step (b) is from about 2 to about 3.4.

4. The method according to claim 1 wherein the ratio of the area of the selectively gas-permeable portions to the area of the non-gas-permeable portions of the package is from about $5*10^{-4}$ to about $2*10^{-3}$.

5. The method according to claim 1 wherein step (a) is carried out for a period of time from about 0.5 to about 5 seconds.

6. The method according to claim 1 wherein the package contains a single banana.

7. The method according to claim 1 wherein the package is sealed after the completion of step (a).

8. The method according to claim 1 comprising the additional step:
   (c) making available for retail sale said bananas in said package.

9. The method according to claim 6 comprising the additional step:
   (c) making available for retail sale said banana in said package.

* * * * *